United States Patent
Yamashita et al.

(10) Patent No.: US 8,773,839 B2
(45) Date of Patent: Jul. 8, 2014

(54) MULTILAYER CERAMIC ELECTRONIC COMPONENT

(75) Inventors: Yasuharu Yamashita, Nagaokakyo (JP);
Kenichi Okajima, Nagaokakyo (JP);
Hideaki Tanaka, Nagaokakyo (JP);
Naoto Muranishi, Nagaokakyo (JP);
Daiki Fukunaga, Nagaokakyo (JP);
Nagato Omori, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 225 days.

(21) Appl. No.: 13/491,624

(22) Filed: Jun. 8, 2012

(65) Prior Publication Data

US 2012/0250220 A1 Oct. 4, 2012

Related U.S. Application Data

(63) Continuation of application No. PCT/JP2010/072215, filed on Dec. 10, 2010.

(30) Foreign Application Priority Data

Dec. 11, 2009 (JP) ................................ 2009-281681

(51) Int. Cl.
| | |
|---|---|
| H01G 4/30 | (2006.01) |
| H01G 4/005 | (2006.01) |
| H01G 4/228 | (2006.01) |
| H01G 4/232 | (2006.01) |

(52) U.S. Cl.
CPC ............... H01G 4/30 (2013.01); H01G 4/005 (2013.01); H01G 4/228 (2013.01); H01G 4/232 (2013.01)
USPC .................. 361/321.2; 361/321.1; 361/306.1; 361/306.3; 361/303; 361/305

(58) Field of Classification Search
CPC ......... H01G 4/30; H01G 4/005; H01G 4/228; H01G 4/232
USPC ................ 361/321.2, 303–305, 306.1, 306.3, 361/311–313, 321.1, 308.1
See application file for complete search history.

(56) References Cited

U.S. PATENT DOCUMENTS

| 6,940,708 B2 * | 9/2005 | Yoshii et al. .................. 361/303 |
| 7,570,477 B2 * | 8/2009 | Kayatani .................... 361/306.3 |

(Continued)

FOREIGN PATENT DOCUMENTS

| JP | 59-222917 A | 12/1984 |
| JP | 60-124813 A | 7/1985 |

(Continued)

OTHER PUBLICATIONS

Official Communication issued in corresponding Japanese Patent Application No. 2011-545260, mailed on Aug. 7, 2012.

(Continued)

*Primary Examiner* — Nguyen T Ha
(74) *Attorney, Agent, or Firm* — Keating & Bennett, LLP

(57) ABSTRACT

A multilayer ceramic electronic component that is small, that has high electrical strength, and that is resistant to separation between ceramic layers includes a ceramic sintered body having a substantially rectangular parallelepiped shape and a plurality of first and second internal electrodes. The plurality of first and second internal electrodes are alternately arranged so as to face each other. The first and second internal electrodes are parallel or substantially parallel to first and second major surfaces. The first and second internal electrodes are exposed to at least one of the fifth and sixth surfaces and are not exposed to the third or fourth surface. No bends exist in any of the ends of each of the first and second internal electrodes adjacent to the third and fourth surfaces.

6 Claims, 11 Drawing Sheets

(56) References Cited

U.S. PATENT DOCUMENTS

| | | | |
|---|---|---|---|
| 7,808,770 B2 * | 10/2010 | Itamura et al. | 361/309 |
| 8,102,641 B2 * | 1/2012 | Koga | 361/306.3 |
| 8,233,265 B2 * | 7/2012 | Otsuka et al. | 361/306.3 |
| 8,310,804 B2 * | 11/2012 | Takashima et al. | 361/303 |
| 2005/0094351 A1 | 5/2005 | Kobayashi | |
| 2006/0139848 A1 | 6/2006 | Kim et al. | |
| 2010/0085682 A1 | 4/2010 | Abe et al. | |

FOREIGN PATENT DOCUMENTS

| | | |
|---|---|---|
| JP | 61-15315 A | 1/1986 |
| JP | 61-237413 A | 10/1986 |
| JP | 61-248413 A | 11/1986 |
| JP | 3-241802 A | 10/1991 |
| JP | 3-241813 A | 10/1991 |
| JP | 05-175073 A | 7/1993 |
| JP | 6-013259 A | 1/1994 |
| JP | 6-349669 A | 12/1994 |
| JP | 7-122455 A | 5/1995 |
| JP | 7-263271 A | 10/1995 |
| JP | 9-153433 A | 6/1997 |
| JP | 10-308322 A | 11/1998 |
| JP | 2003-318060 A | 11/2003 |
| JP | 2004-179349 A | 6/2004 |
| JP | 2005-136131 A | 5/2005 |
| JP | 2006-179873 A | 7/2006 |
| JP | 2010-092896 A | 4/2010 |
| JP | 2010-093037 A | 4/2010 |
| JP | 2010-093038 A | 4/2010 |
| JP | 2012-094819 A | 5/2012 |
| JP | 2012-094820 A | 5/2012 |

OTHER PUBLICATIONS

Official Communication issued in International Patent Application No. PCT/JP2010/072215, mailed on Mar. 8, 2011.

Yamashita; "Monolithic Ceramic Electronic Component"; U.S. Appl. No. 13/491,625, filed Jun. 8, 2012.

Fukunaga et al.; "Monolithic Ceramic Capacitor"; U.S. Appl. No. 13/491,626, filed Jun. 8, 2012.

Shiota; "Monolithic Ceramic Capacitor"; U.S. Appl. No. 13/491,627, filed Jun. 8, 2012.

* cited by examiner

MULTILAYER CERAMIC ELECTRONIC COMPONENT

BACKGROUND OF THE INVENTION

1. Field of the Invention

The present invention relates to a multilayer ceramic electronic component. In particular, the present invention relates to a multilayer ceramic electronic component that includes a ceramic sintered body having a substantially rectangular parallelepiped shape and a plurality of first and second internal electrodes alternately arranged in the ceramic sintered body so as to face each other.

2. Description of the Related Art

In electronic devices, such as cellular phones and notebook computers, multilayer ceramic electronic components, typified by, for example, multilayer ceramic capacitors, have been frequently used.

In recent years, multilayer ceramic capacitors have become smaller and smaller and their capacities have become larger and larger. A large-capacity multilayer ceramic capacitor of 10 μF to 100 μF is used in a power supply circuit or other circuit, in which an aluminum electrolytic capacitor or a tantalum capacitor is traditionally used. Generally, capacitance is proportional to the relative dielectric constant, the opposing area of internal electrodes, and the number of stacked layers of the internal electrodes and is inversely proportional to the thickness of the dielectric layer. Thus, to achieve a large capacitance within predetermined dimensions, various techniques have been used. For a large-capacity multilayer ceramic capacitor, the thickness of the dielectric layer must be no more than 1 μm and the dielectric material, for example, barium titanate must be finer such that the grain size is at or below 1 μm while achieving high crystallinity. The number of stacked layers of the internal electrodes may reach 1,000, and the electrodes are required to be smooth and have wide coverage. In addition, the ceramic layers and the internal electrodes are integrally sintered and formed into a monolithic structure in the production process, and it is required that an internal stress caused by expansion and contraction in the sintering be reduced and the structure have no structural defects. To this end, various multilayer ceramic electronic components and methods of producing the same are described in Japanese Unexamined Patent Application Publication No. 2003-318060 and other documents, to produce a multilayer ceramic electronic component in which defects, such as cracks and delamination, after firing can be prevented even when ceramic green sheets and internal electrodes are made to be thin and to be stacked high.

One example of a method for enhancing functionality of a multilayer ceramic electronic component is a method of developing a ceramic material having high functionality. Unfortunately, the development of the ceramic material having high functionality requires time and efforts.

Another example of a method for enhancing functionality of a multilayer ceramic electronic component is a method of thinning a ceramic layer, increasing the number of stacked layers, and increasing the opposing area of the internal electrodes.

Unfortunately, the multilayer ceramic electronic component in which the ceramic layers are thin, the number of stacked layers is large, and the opposing area of the internal electrodes is large suffers from low electrical strength.

SUMMARY OF THE INVENTION

To overcome the problems described above, preferred embodiments of the present invention provide a multilayer ceramic electronic component that is small and that has high electrical strength.

The present inventors conducted extensive research, discovered that the existence of a bend in an end of an internal electrode decreases the electrical strength, and, as a result, developed preferred embodiments of the present invention. That is, when ceramic green sheets on which conductive patterns that define internal electrodes are provided are stacked, a minute bend 2a resulting from misregistration of stacking of the green sheets, the difference in density from the internal electrodes, and the spreading of the internal electrodes occurring during formation thereof is formed in an end of a conductive pattern 2, as illustrated in FIG. 23. When the bend 2a occurs, because an electric field tends to concentrate on the bend 2a (in particular, at an inner side of the bend 2a), it was discovered that the electrical strength of the multilayer ceramic electronic component decreases.

A multilayer ceramic electronic component according to a preferred embodiment of the present invention preferably includes a ceramic sintered body having a substantially rectangular parallelepiped shape and including a plurality of first and second internal electrodes. The ceramic sintered body includes a ceramic material. The ceramic sintered body includes first and second surfaces, third and fourth surfaces, and fifth and sixth surfaces. The first and second surfaces extend along a first direction and a second direction. The second direction is perpendicular or substantially perpendicular to the first direction. The third and fourth surfaces extend along the first direction and a third direction. The third direction is perpendicular or substantially perpendicular to both the first and second directions. The fifth and sixth surfaces extend along the second and third directions. The first and second internal electrodes are alternately arranged in the ceramic sintered body so as to face each other. The first and second internal electrodes are parallel or substantially parallel to the first and second surfaces. The first and second internal electrodes are exposed to at least one of the third and fourth surfaces and are not exposed to the fifth or sixth surfaces. No bends exist in any ends of each of the first and second internal electrodes, the ends being adjacent to the fifth and sixth surfaces. In the second direction, the positions of both ends of each of the plurality of first and second internal electrodes are preferably aligned or substantially aligned.

In preferred embodiments of the present invention, the phrase "no bends exist" includes both the case in which the length of a bend is zero and the case in which the length of a bend is at or below about 1 μm, for example.

In a preferred embodiment of the multilayer ceramic electronic component according to the present invention, the ceramic sintered body may preferably include first and second major surfaces extending along a longitudinal direction and a width direction, first and second end surfaces extending along the width direction and a thickness direction, and first and second side surfaces extending along the longitudinal direction and the thickness direction. The first direction may be the longitudinal direction, the second direction may be the width direction, the third direction may be the thickness direction, the first and second surfaces may be the first and second major surfaces, the third and fourth surfaces may be the first and second side surfaces, and the fifth and sixth surfaces may be the first and second end surfaces.

In another preferred embodiment of the multilayer ceramic electronic component according to the present invention, the first direction may be a longitudinal direction, the second direction may be a thickness direction, the third direction may be a width direction, the first and second surfaces may be first and second side surfaces, the third and fourth surfaces may be first and second major surfaces, and the fifth and sixth surfaces may be first and second end surfaces.

In still another preferred embodiment of the multilayer ceramic electronic component according to the present invention, the plurality of first internal electrodes may be exposed to the third surface, ends thereof adjacent to the fourth surface may not be exposed to the fourth surface, the plurality of second internal electrodes may be exposed to the fourth surface, and ends thereof may not be exposed to the third surface. Each of at least the plurality of first internal electrodes or the plurality of second internal electrodes may include a saddle in an end adjacent to the fourth surface or the third surface, the saddle being thicker than a remaining portion of the internal electrode. Of at least the plurality of saddles in the plurality of first internal electrodes or the plurality of saddles in the plurality of second internal electrodes, at least one saddle of the plurality of saddles may not overlap remaining saddles in the third direction. In this case, in production of a ceramic sintered body, when an unfired ceramic stack is pressed in the direction in which the first and second internal electrodes are stacked and the ceramic layers are closely attached to each other, a difference in level is less likely to occur in the ceramic stack, in comparison with the case in which all saddles overlap each other. Accordingly, delamination is unlikely to occur after firing. Thus, the electrical strength can be increased.

In another preferred embodiment of the multilayer ceramic electronic component according to the present invention, a ceramic layer disposed between the first and second internal electrodes facing each other may preferably have a thickness within a range of about 0.3 μm to about 2 μm, for example. In this case, because, if a bend having a plurality of inflection points exists, the electrical strength greatly decreases, the present preferred embodiment is especially effective.

In another preferred embodiment of the multilayer ceramic electronic component according to the present invention, a ceramic layer disposed between the first and second internal electrodes facing each other may preferably have a thickness within a range of about one to about three times a thickness of each of the first and second internal electrodes, for example. In this case, because, if a bend having a plurality of inflection points exists, the electrical strength greatly decreases, the present preferred embodiment is especially effective.

In various preferred embodiments of the present invention, no bends including a plurality of inflection points exist in ends of each of the first and second internal electrodes adjacent to the fifth and sixth surfaces. Therefore, even when the ceramic layer between the first and second internal electrodes is thin and the number of stacked layers is large, a decrease in electrical strength is minimized or prevented. Accordingly, both miniaturization and high electrical strength is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Specific preferred embodiments of a multilayer ceramic electronic component according to the present invention are described below with reference to the drawings. The ceramic electronic component according to preferred embodiments of the present invention is not limited to multilayer ceramic electronic component 1 and 2.

First Preferred Embodiment

Figure 1:
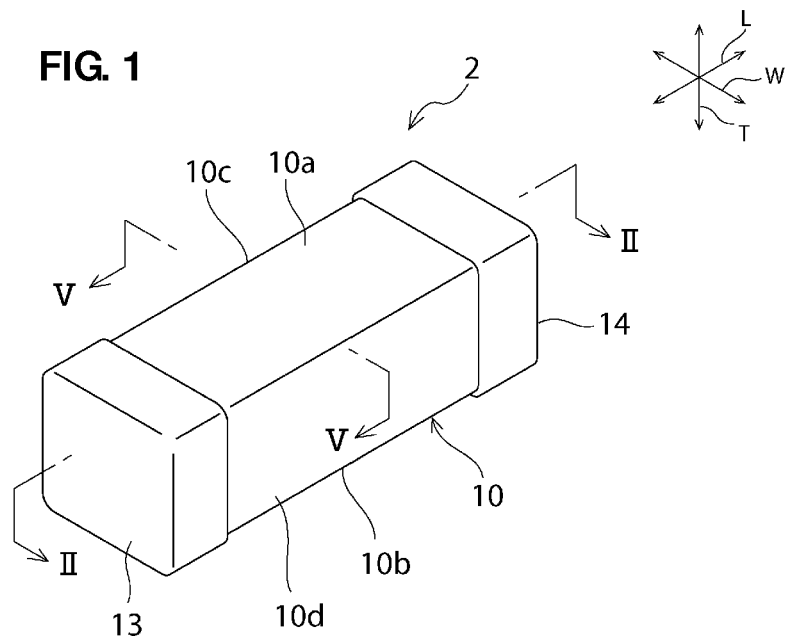
FIG. 1 is a schematic perspective view of a ceramic electronic component according to a first preferred embodiment of the present invention.
Figure 2:
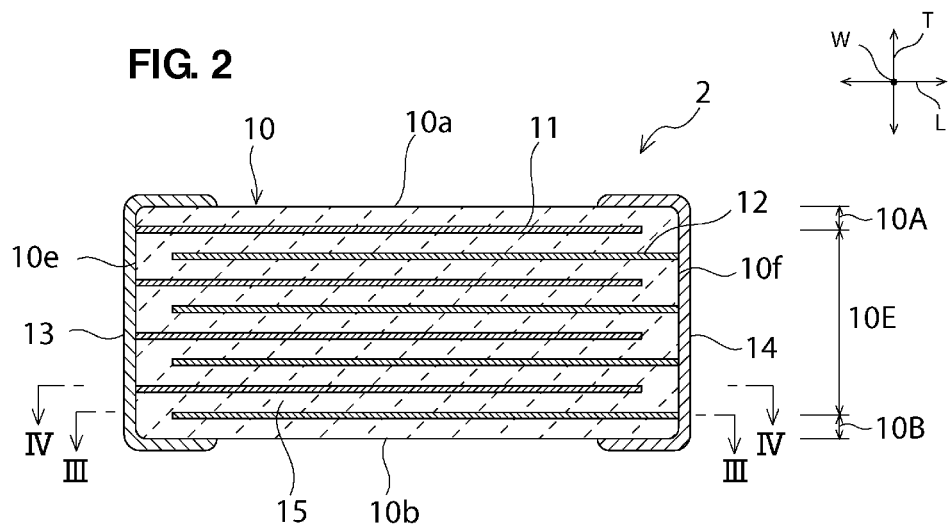
FIG. 2 is a cross-sectional view taken along the line II-II in FIG. 1.
Figure 3:
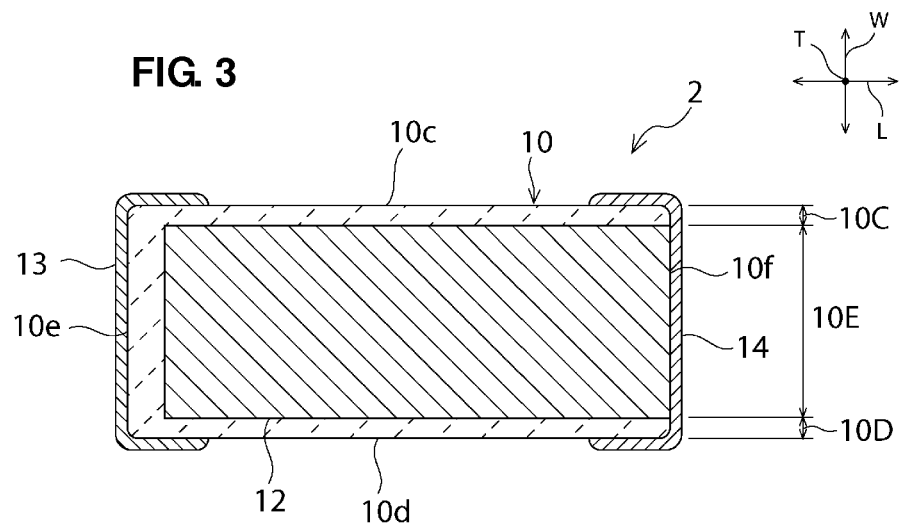
FIG. 3 is a cross-sectional view taken along the line III-III in FIG. 2.
Figure 4:
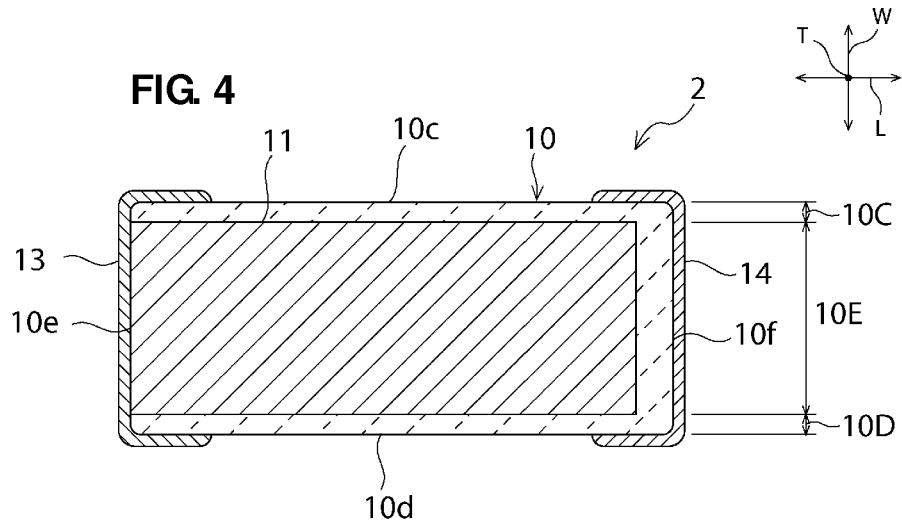
FIG. 4 is a cross-sectional view taken along the line IV-IV in FIG. 2.
Figure 5:
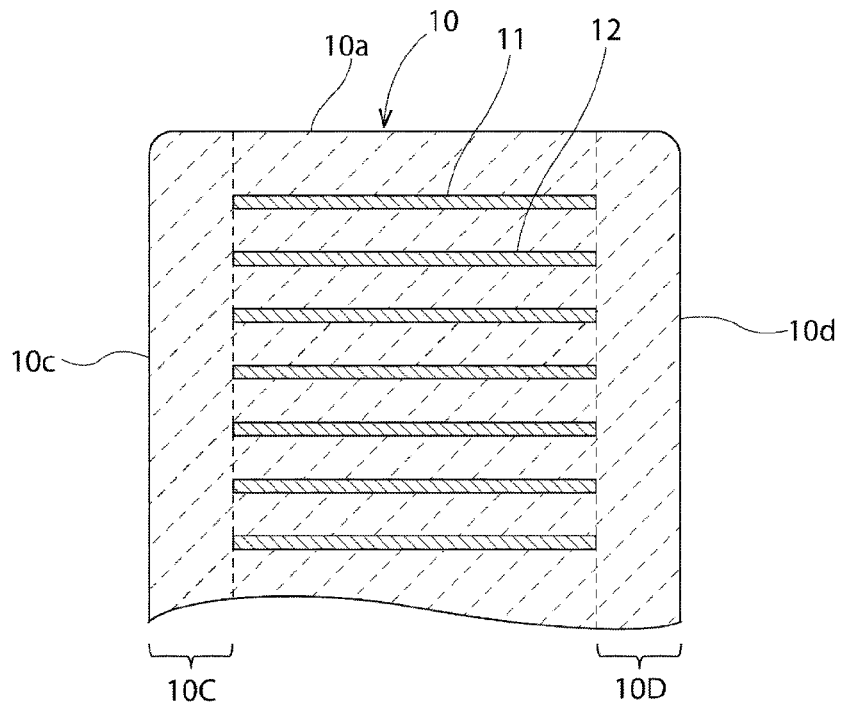
FIG. 5 is a partially enlarged cross-sectional view taken along the line V-V in FIG. 1.
Figure 6:
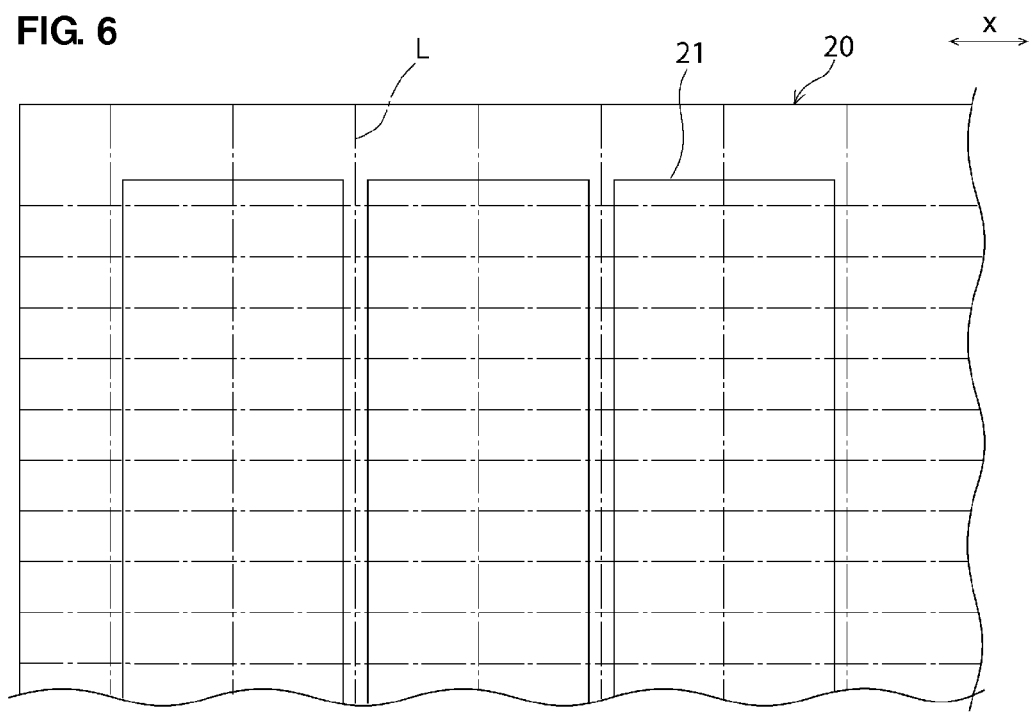
FIG. 6 is a schematic plan view of a ceramic green sheet on which conductive patterns are printed.

FIG. 1 is a schematic perspective view of a ceramic electronic component according to a first preferred embodiment of the present invention. FIG. 2 is a cross-sectional view taken along the line II-II in FIG. 1. FIG. 3 is a schematic cross-sectional view taken along the line III-III in FIG. 2. FIG. 4 is a schematic cross-sectional view taken along the line IV-IV in FIG. 2. FIG. 5 is a partially enlarged cross-sectional view taken along the line V-V in FIG. 1. FIG. 6 is a schematic enlarged cross-sectional view of a portion VI in FIG. 5.

As illustrated in FIG. 1, a multilayer ceramic electronic component 2 according to the present preferred embodiment preferably includes a ceramic sintered body 10 having a substantially rectangular parallelepiped shape. The ceramic sintered body 10 includes first and second major surfaces 10a and 10b (first and second surfaces), first and second side surfaces 10c and 10d (third and fourth surfaces), and first and second end surfaces 10e and 10f (fifth and sixth surfaces). The first and second major surfaces 10a and 10b (first and second surfaces) extend along the longitudinal direction L (first direction) and the width direction W (second direction). The first and second side surfaces 10c and 10d (third and fourth surfaces) extend along the longitudinal direction L (first direction) and the thickness direction T (third direction). The first and second end surfaces 10e and 10f (fifth and sixth surfaces) extend along the width direction W (second direction) and the thickness direction T (third direction).

The ceramic sintered body 10 includes a ceramic material. In the present preferred embodiment, the ceramic sintered body 10 includes a firing aid, such as silicon or a glass component, for example, in addition to the ceramic material. Specific examples of the glass component as the firing aid can preferably include a silicate glass, a borate glass, a borosilicate glass, and a phosphate glass that include an alkali metal component or an alkaline earth metal component.

The type of the ceramic material can be selected as appropriate, depending on the function required for the multilayer ceramic electronic component 2.

For example, when the multilayer ceramic electronic component 2 to be produced is a capacitor, the ceramic sintered body 10 can preferably be made of a dielectric ceramic. Specific examples of the dielectric ceramic include barium titanate ($BaTiO_3$), perovskite ($CaTiO_3$), strontium titanate ($SrTiO_3$), and calcium zirconate ($CaZrO_3$). An accessory ingredient, such as a manganese compound, an iron compound, a chromium compound, a cobalt compound, or a nickel compound, may be added to the dielectric ceramic as appropriate.

When the multilayer ceramic electronic component 2 to be produced is a ceramic piezoelectric element, the ceramic sintered body 10 can preferably be made of a piezoelectric ceramic. A specific example of the piezoelectric ceramic is a lead zirconate titanate (PZT)-based ceramic.

When the multilayer ceramic electronic component 2 to be produced is a thermistor element, the ceramic sintered body 10 can preferably be made of a semiconductor ceramic. A specific example of the semiconductor ceramic is a spinel-based ceramic.

When the multilayer ceramic electronic component 2 to be produced is an inductor element, the ceramic sintered body 10 can preferably be made of a magnetic ceramic. A specific example of the magnetic ceramic is a ferrite ceramic.

As illustrated in FIGS. 2 to 5, a plurality of first and second internal electrodes 11 and 12 are disposed in the ceramic sintered body 10. Each of the first and second internal electrodes 11 and 12 is parallel or substantially parallel to the first and second major surfaces 10a and 10b. The planar shape of each of the first and second internal electrodes 11 and 12 preferably is rectangular or substantially rectangular, for example. The plurality of first and second internal electrodes 11 and 12 are alternately arranged so as to face each other in the thickness direction T. That is, the first and second internal electrodes 11 and 12 are arranged with a plurality of ceramic layers 15 disposed therebetween so as to face each other in the thickness direction T, the plurality of ceramic layers 15 being disposed in the ceramic sintered body 10.

The thickness of each of the ceramic layers 15 may preferably be within the range of about 0.3 μm to about 2 μm, for example. The thickness of each of the first and second internal electrodes 11 and 12 may preferably be within the range of about 0.2 μm to about 1 μm, for example. The thickness of the ceramic layer 15 may preferably be within the range of about one to about three times the thickness of each of the first and second internal electrodes 11 and 12.

The first internal electrodes 11 are exposed to the first end surface 10e, but not exposed to the second end surface 10f, the first or second major surface 10a or 10b, or the first or second side surface 10c or 10d. The second internal electrodes 12 are exposed to the second end surface 10f, but not exposed to the first end surface 10e, the first or second major surface 10a or 10b, or the first or second side surface 10c or 10d.

The first end surface 10e is overlaid with a first external electrode 13. The first external electrode 13 is connected to the first internal electrodes 11. The second end surface 10f is overlaid with a second external electrode 14. The second external electrode 14 is connected to the second internal electrodes 12.

The material of each of the first and second internal electrodes 11 and 12 and the first and second external electrodes 13 and 14 is not particularly limited as long as it is conductive. The first and second internal electrodes 11 and 12 and the first and second external electrodes 13 and 14 can preferably be made of a metal, such as silver, gold, platinum, palladium, nickel, chromium, aluminum, or a copper, or an alloy containing one or more of these metals, for example. The first and second internal electrodes 11 and 12 and the first and second external electrodes 13 and 14 may also preferably be made of a stack of a plurality of conductive films.

As illustrated in FIGS. 2 and 3, the ceramic sintered body 10 includes first and second outer layer portions 10A and 10B, first and second side gaps 10C and 10D, and an inner layer portion 10E.

The first and second outer layer portions 10A and 10B are portions outside the portions in which the first and second internal electrodes 11 and 12 are disposed in the opposing direction of the first and second internal electrodes (=thickness direction T). Specifically, in the present preferred embodiment, the first and second outer layer portions 10A and 10B are disposed in both ends in the thickness direction T of the ceramic sintered body 10.

The first and second side gaps 10C and 10D are portions in which none of the first and second internal electrodes 11 and 12 is disposed when seen from the opposing direction (=thickness direction T). Specifically, in the present preferred embodiment, the first and second side gaps 10C and 10D are disposed in both ends in the width direction W of the ceramic sintered body 10.

The inner layer portion 10E is a portion in the ceramic sintered body 10 other than the first and second outer layer portions 10A and 10B and the first and second side gaps 10C and 10D. Specifically, in the present preferred embodiment, the inner layer portion 10E is disposed in a portion other than both ends in the thickness direction T and both ends in the width direction W of the ceramic sintered body 10. The inner layer portion 10E includes the portion in which the first and second internal electrodes 11 and 12 face each other in the thickness direction T and the portion in which, when seen from the thickness direction T, only the first or second internal electrodes 11 or 12 are disposed.

Figure 23:
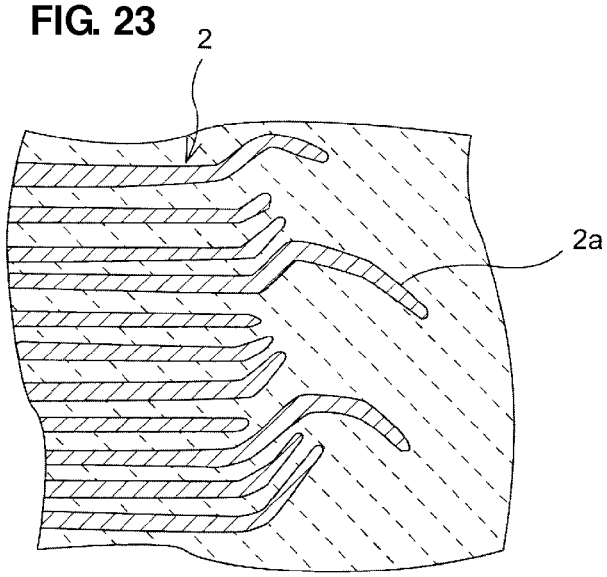
FIG. 23 is an enlarged diagrammatic view of ends of internal electrodes in which bends occur.

In the present preferred embodiment, for example, even when the multilayer ceramic electronic component 2 is observed with a 500× optical microscope, no bends including a plurality of inflection points (see FIG. 23) exist in ends of each of the first and second internal electrodes 11 and 12 adjacent to the first and second side surfaces 10c and 10d (third and fourth surfaces). That is, as illustrated in the partially enlarged cross-sectional view in FIG. 5, the above-described bends do not exist in the ends of each of the plurality of first internal electrodes 11 and the plurality of second internal electrodes 12 adjacent to the first and second side surfaces 10c and 10d.

Next, one example of a method of producing the multilayer ceramic electronic component 2 according to the present preferred embodiment is described in detail with reference to the FIGS. 6 to 8.

First, a ceramic green sheet 20 illustrated in FIG. 6 is shaped. A method of shaping the ceramic green sheet 20 is not particularly limited. The ceramic green sheet 20 can preferably be shaped using a die coater, a gravure coater, a micro-gravure coater, or other coaters, for example.

Then, conductive patterns 21 are formed on the ceramic green sheet 20. The conductive patterns 21 are for forming the first and second internal electrodes 11 and 12. A method of forming the conductive patterns 21 is not particularly limited. The conductive patterns 21 can preferably be formed by screen printing, ink-jetting, gravure printing, or other methods, for example.

Then, the ceramic green sheets 20 including the conductive patterns 21 are stacked to form a stack. Specifically, first, after ceramic green sheets 20 not including the conductive patterns 21 are stacked, ceramic green sheets 20 including the conductive patterns 21 are stacked such that they are alternately displaced on one side and the other side in the x direction. Additionally, ceramic green sheets 20 not including the conductive patterns 21 are stacked on the above-described stack, and the stack is completed. Here, the initially and lastly stacked ceramic green sheets 20 not including the conductive patterns 21 are for forming the first and second outer layer portions 10A and 10B.

Figure 7:
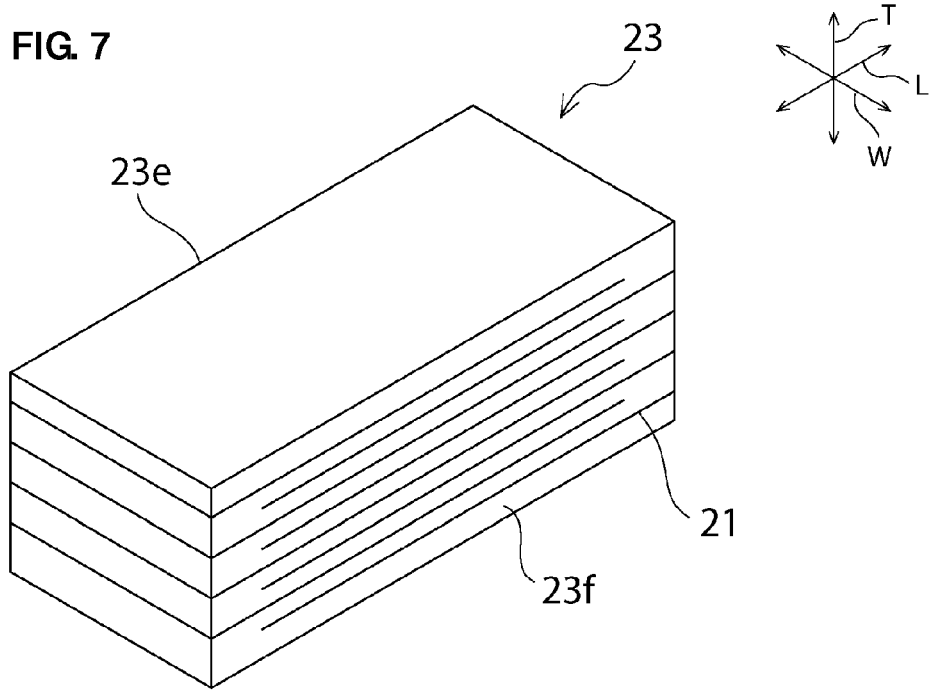
FIG. 7 is a schematic perspective view of a ceramic member.

Then, the stack is cut along imaginary cut lines L illustrated in FIG. 6, and ceramic members 23 each having a substantially rectangular parallelepiped shape illustrated in FIG. 7 are formed. The stack can be cut by dicing or by pressing down. The stack may also be cut using a laser.

Figure 8:
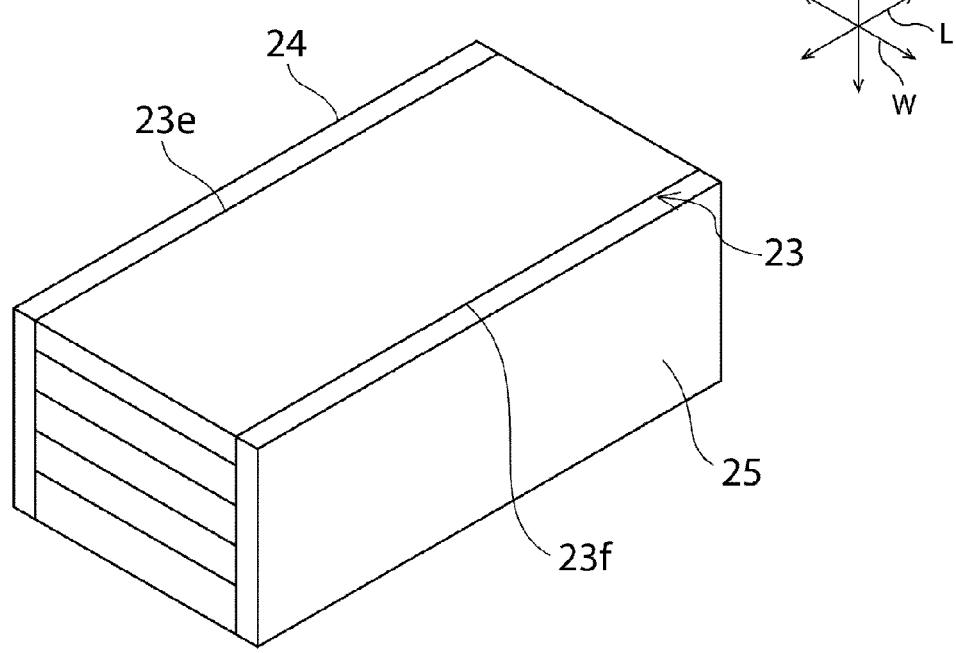
FIG. 8 is a schematic perspective view that illustrates a process of forming a ceramic layer on both side surfaces.

Then, as illustrated in FIG. 8, ceramic layers 24 and 25 are formed on side surfaces 23e and 23f of each of the ceramic members 23 so as to cover the side surfaces 23e and 23f. The ceramic layers 24 and 25 are for forming the first and second side gaps 10C and 10D.

A method of forming the ceramic layers 24 and 25 is not particularly limited. They can be formed by printing, such as screen printing, ink-jetting, coating, such as gravure coating, spraying, or other methods, for example.

Then, the ceramic member 23 including the ceramic layers 24 and 25 is sintered. In this manner, the ceramic sintered body 10 is completed.

Lastly, the first and second external electrodes 13 and 14 are formed, and the multilayer ceramic electronic component 2 is completed. A method of forming the first and second external electrodes 13 and 14 is not particularly limited. The first and second external electrodes 13 and 14 may also be formed by baking after conductive paste is applied, for example. In that case, the conductive paste may be applied before the ceramic member 23 is fired, and the first and second external electrodes 13 and 14 may be formed simultaneously during firing. The first and second external electrodes 13 and 14 may also be formed by plating, for example.

Experimental Example

The multilayer ceramic electronic component 2 according to the above-described preferred embodiment was produced and evaluated. As the multilayer ceramic electronic component, a multilayer ceramic capacitor was produced under the conditions described below.

Preferably, the dimension in the longitudinal direction is about 1.02 mm, the dimension in the width direction is about 0.53 mm, the dimension in the thickness direction is about 0.53 mm, the width of the side gap is about 0.05 mm, and the dimension of the end gap is about 0.09 mm, for example. The dimension of the end gap is the dimension between the tip of the internal electrode, that is, the tip of the first or second internal electrode 11 or 12 in the longitudinal direction L and the first or second end surface 10e or 10f to which that tip is not exposed. The thickness of the ceramic layer disposed between the first and second internal electrodes 11 and 12 is preferably about 1.1 μm and the thickness of an external ceramic layer is preferably about 0.05 mm, for example. The external ceramic layer is the external ceramic layer positioned outside the portion in which the first and second internal electrodes overlap each other. The thickness of the internal electrode is preferably about 0.6 μm. The number of stacked layers of the internal electrodes is preferably 220, for example.

As Example 1, in accordance with the above-described preferred embodiment, the multilayer ceramic electronic component 2 in which the side gaps were formed afterward by formation of the ceramic layers was prepared. In pressing a green stack, rubber pressing of arranging an elastic member between a die and the stack was used.

For comparison, first and second comparative examples described below were prepared.

In the first comparative example, side gaps were not formed by post-processing with a traditional method, after a mother ceramic stack was cut, and stacks corresponding to units of individual multilayer ceramic electronic components configured such that internal electrodes were not exposed to the side surfaces were obtained. The rest of the manufacturing method was substantially the same as in Example 1. In pressing the green stack, rubber pressing was used, as in Example 1.

Comparative Example 2

A green stack was obtained as in Comparative Example 1. In pressing the green stack, rigid body pressing of bringing a die and the stack into direct intimate contact with each other was used. The rest of the manufacturing method was substantially the same as in Comparative Example 1.

In the multilayer ceramic electronic component of each of Example 1, Comparative Example 1, and Comparative Example 2 prepared in the above-described manner, the ceramic sintered body 10 was ground from the end surface 10e on a first side thereof, and the grinding was stopped as soon as the first and second internal electrodes 11 and 12 became visible. It was checked using an optical microscope whether bends existed in both ends in the width direction of each of the first and second internal electrodes 11 and 12.

Separately, the ceramic sintered body 10 was ground from the end surface 10f on a second side thereof, and the grinding was stopped as soon as the first and second internal electrodes 11 and 12 became visible. It was checked using the optical microscope whether bends existed in both ends in the width direction of each of the internal electrodes.

Moreover, the ceramic sintered body 10 was ground from the end surface 10e on the first side thereof to the center in the longitudinal direction. It was checked using the optical microscope whether bends existed in both ends in the width direction of each of the first and second internal electrodes 11 and 12.

That is, the presence or absence of bends in end surfaces extending along the WT directions in three locations of the ceramic sintered body was checked by the method described in the above.

If an impurity or an internal electrode portion extended by grinding remains on a ground surface, it may be confused with a bend. Accordingly, the ground surface was subjected to ion milling, the impurity or the internal electrode portion extended by grinding was removed, and the presence or absence of bends was checked.

As the optical microscope, Measurescope MM-10 (500× magnification, ±0.1 µm accuracy) of Nikon Corporation was used.

In the above-described manner, the total number of bends observed by the three methods was determined. That is, because the number of stacked layers of the internal electrodes is 220, if bends exist in both ends in the width direction of all of the internal electrodes, 440 bends exist.

Thirty multilayer ceramic electronic components of each of Example 1, Comparative Example 1, and Comparative Example 2 were prepared, and BDV (dielectric breakdown voltage) tests were conducted. That is, a direct-current voltage was applied to each of the ceramic electronic components under the condition of about 100 V/s, and BDV was measured.

Figure 10:
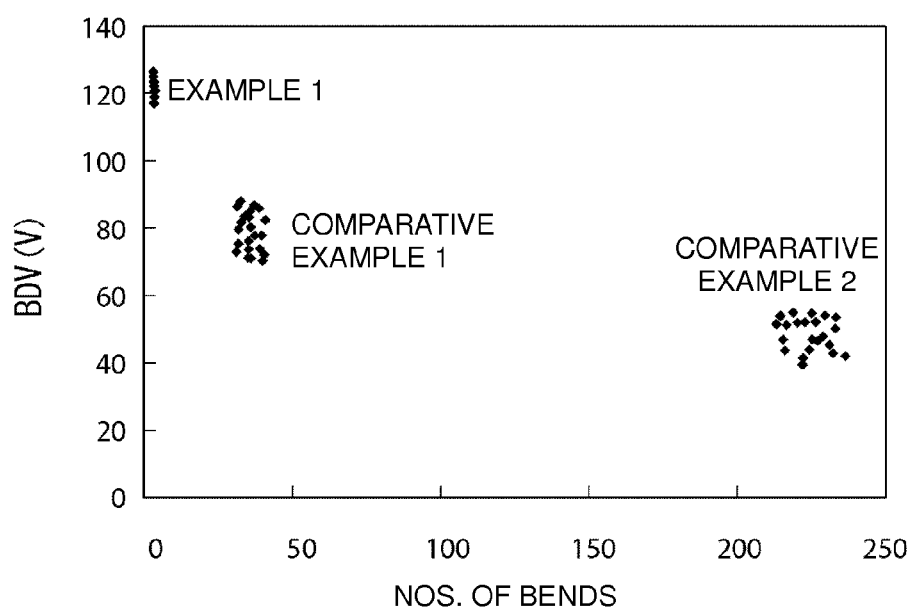
FIG. 10 illustrates the number of bends and the dielectric breakdown voltage (BDV) of multilayer ceramic electronic components of Example 1 and Comparative Examples 1 and 2.

FIG. 10 illustrates the number of bends and the results of the BDV tests determined in the above-described manner.

As is clear from FIG. 10, for Example 1, BDV was as high as approximately 120 V, and the number of bends was approximately 0 for 440 locations. In contrast, for Comparative Example 1, the number of bends was approximately 40, and BDV was approximately 80 V. For Comparative Example 2, the number of bends was approximately 220 for 440 locations on average, and BDV was approximately 50 V.

Accordingly, for Example 1, where substantially no bends exist, it was discovered that the non-existence of bends enables a significant increase in electrical strength.

Modified Example of First Preferred Embodiment

Figure 9:
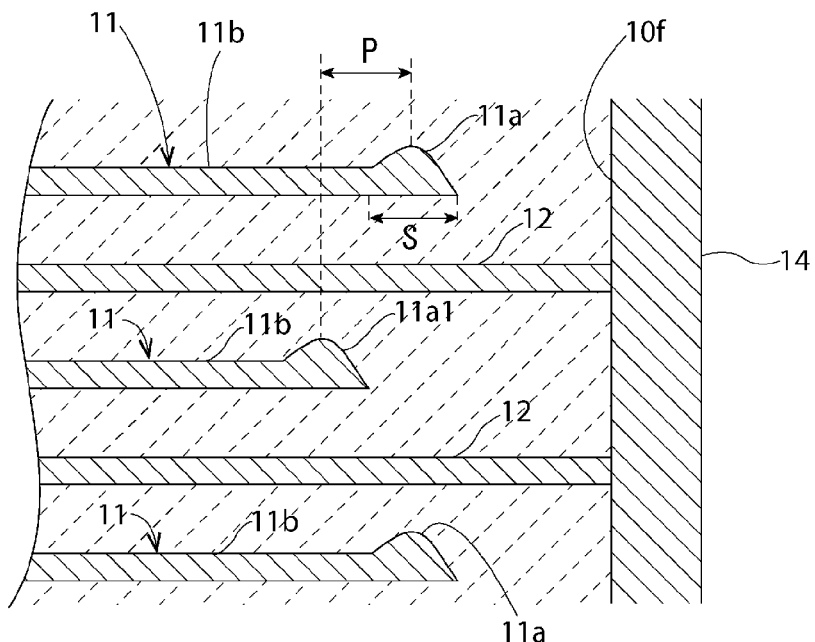
FIG. 9 is a partially enlarged front view for describing a modified example of the multilayer ceramic electronic component according to the first preferred embodiment of the present invention.

FIG. 9 is a partially enlarged front view describing a modified example of the multilayer ceramic electronic component 2 according to the first preferred embodiment. In the present modified example, a saddle 11a is formed on the tip of each of the plurality of first internal electrodes 11. The saddle 11a occurs in an internal electrode edge portion at the time of forming an internal electrode by printing of conductive paste.

The saddle 11a is thicker than a remaining portion 11b of the first internal electrode 11.

Accordingly, if the saddles 11a overlap each other in the thickness direction, when a green stack is pressed in the thickness direction before firing, adhesion between the ceramic layers on both sides of each of the saddles 11a, that is, the ceramic green sheets may be decreased. The force exerted by the pressing on the portion in which the saddles 11a overlap each other and that on the portion in which no saddles 11a exist are significantly different. Therefore, delamination may occur in the ceramic sintered body after firing.

As described above, if at least one saddle 11a1 is displaced from the remaining saddles 11a in the longitudinal direction, not only can delamination be minimized or prevented, but the distance from the internal electrode connected to a different potential and next to the saddle can also be reduced. Therefore, the electrical strength can be improved.

Therefore, even when the ceramic layer 15 between the first and second internal electrodes 11 and 12 is thin and the number of stacked layers is large, a decrease in the electrical strength is minimized or prevented. Specifically, avoiding a bend having a plurality of inflection points (that is, making the length of a bend substantially zero (about 1 µm or less)) enables a high dielectric breakdown voltage (BDV) and a long mean time to failure (MTTF). Accordingly, miniaturization, high performance, high electrical strength, and high reliability are achieved. The reason why BDV decreases and MTTF becomes short when a bend exists is that the ceramic layer between the bend and the neighboring internal electrode includes a local thin portion and an electric field concentrates on that thin portion.

In contrast, in the present modified example, as illustrated in FIG. 9, at least one saddle 11a1 in the first internal electrode 11 is preferably arranged so as not to overlap the other saddles 11a in the thickness direction. In other words, in the third direction in the present invention, at least one saddle 11a1 is preferably displaced from the other saddles 11a. For the amount of the displacement, when the distance between the points of the saddle 11a1 and each of the other saddles 11a is P, P may preferably be equal to or greater than about ½ of the dimension S in the longitudinal direction of the saddle 11a, for example. More preferably, P may be equal to or greater than the dimension S, for example.

More preferably, none of the plurality of saddles 11a of the plurality of first internal electrodes 11 may overlap each other in the thickness direction.

The dimension S may preferably be about 100 µm to about 200 µm, for example. The dimension P may preferably be about 20 µm to about 40 µm, for example. The thickness of the portion of the saddle 11a1 protruding from the first internal electrode 11 may preferably be about 10% or more of the thickness of (the portion where no saddle exists of) the first internal electrode 11, for example.

In FIG. 9, the plurality of first internal electrodes 11 are illustrated. Similarly, for the plurality of second internal electrodes 12, at least one saddle of the plurality of saddles may preferably be displaced from the remaining saddles in the longitudinal direction. With this, delamination of a ceramic sintered body on the tip side of the second internal electrodes can also be minimized or prevented.

It is required that, of at least the plurality of first internal electrodes 11 or the plurality of second internal electrodes 12, at least one saddle be arranged so as not to overlap the remaining saddles in the thickness direction, as described above.

In the present preferred embodiment, because substantially no saddles occur in both ends of each of the internal electrodes along the width direction W, it is unnecessary to displace the internal electrodes in the width direction W. Therefore, the opposing area of the internal electrodes in the width direction W can be maximized, and it is advantageous in terms of an increase in capacity.

Second Preferred Embodiment

Figure 11:
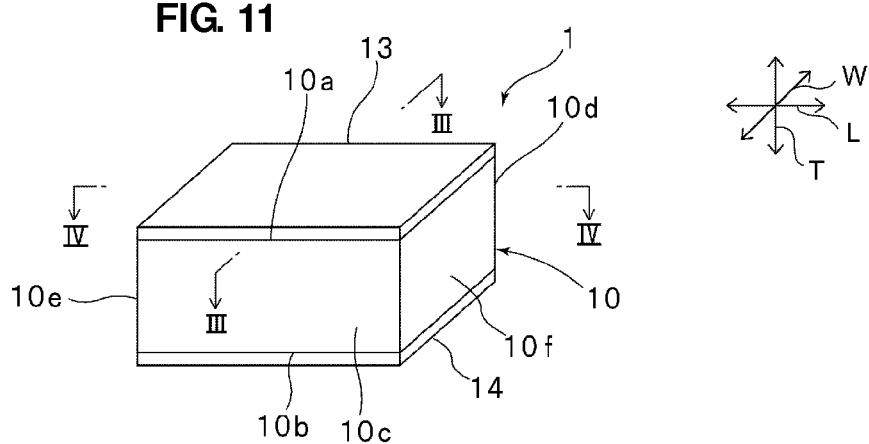
FIG. 11 is a schematic perspective view of a ceramic electronic component according to a second preferred embodiment of the present invention.
Figure 12:
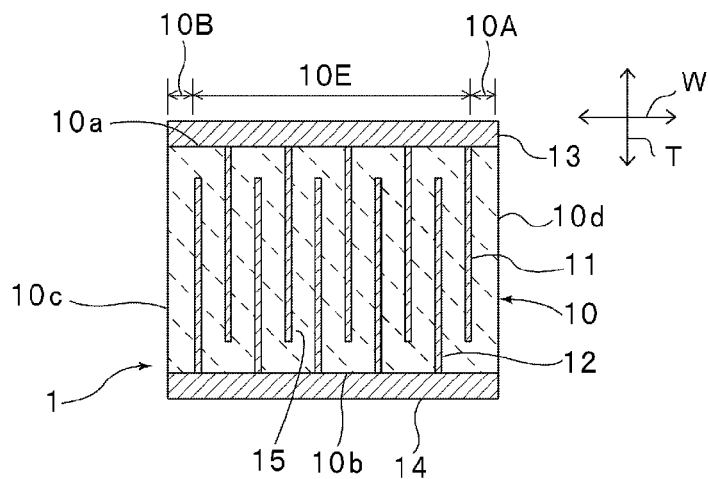
FIG. 12 is a schematic cross-sectional view taken along the line III-III in FIG. 11.
Figure 13:
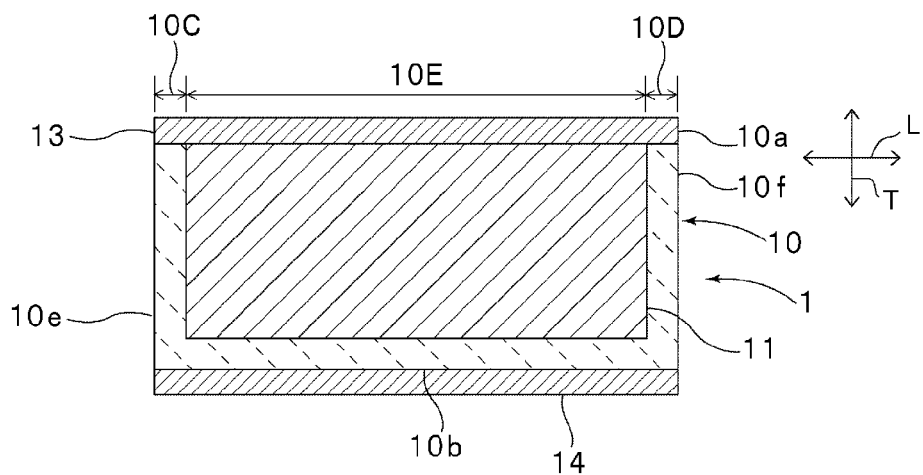
FIG. 13 is a schematic cross-sectional view taken along the line IV-IV in FIG. 11.

FIG. 11 is a schematic perspective view of a ceramic electronic component according to a second preferred embodiment of the present invention. FIG. 12 is a schematic cross-sectional view taken along the line III-III in FIG. 11. FIG. 13 is a schematic cross-sectional view taken along the line IV-IV in FIG. 11.

As illustrated in FIG. 11, a multilayer ceramic electronic component 1 in the present preferred embodiment preferably includes the ceramic sintered body 10 having a substantially rectangular parallelepiped shape. The ceramic sintered body 10 includes the first and second major surfaces 10a and 10b, the first and second side surfaces 10c and 10d, and the first and second end surfaces 10e and 10f. The first and second major surfaces 10a and 10b extend along the longitudinal direction L and the width direction W. The first and second side surfaces 10c and 10d extend along the longitudinal direction L and the thickness direction T. The first and second end surfaces 10e and 10f extend along the width direction W and the thickness direction T. In the present preferred embodiment, the first and second side surfaces 10c and 10d correspond to first and second surfaces. The first and second major surfaces 10a and 10b correspond to third and fourth surfaces. The first and second end surfaces 10e and 10f correspond to fifth and sixth surfaces. The longitudinal direction L corresponds to a first direction. The thickness direction T corresponds to a second direction. The width direction W corresponds to a third direction.

The ceramic sintered body 10 is preferably made of the same material as that of the ceramic sintered body 10 in the first preferred embodiment.

As illustrated in FIGS. 12 and 13, the first and second internal electrodes 11 and 12 are disposed in the ceramic sintered body 10. The first and second internal electrodes 11 and 12 are alternately arranged with the ceramic layers 15 disposed therebetween so as to face each other in the width direction W. Each of the first and second internal electrodes 11 and 12 is parallel or substantially parallel to the first and second side surfaces 10c and 10d. The planar shape of each of the first and second internal electrodes 11 and 12 is preferably rectangular or substantially rectangular, for example.

The thickness of each of the ceramic layers 15 may preferably be within the range of about 0.3 µm to about 2 µm, for example. The thickness of each of the first and second internal electrodes 11 and 12 may preferably be within the range of about 0.2 µm to about 1 µm, for example. The thickness of the ceramic layer 15 may preferably be within the range of about one to about three times the thickness of each of the first and second internal electrodes 11 and 12, for example.

The first internal electrodes 11 are exposed to the first major surface 10a (third surface), but are not exposed to the second major surface 10b (fourth surface), the first or second side surface 10c or 10d (first or second surface), or the first or second end surface 10e or 10f (fifth or sixth surface). The second internal electrodes 12 are exposed to the second major surface 10b (fourth surface), but are not exposed to the first major surface 10a (third surface), the first or second side surface 10c or 10d (first or second surface), or the first or second end surface 10e or 10f (fifth or sixth surface).

The first major surface 10a is overlaid with the first external electrode 13. The first external electrode 13 is connected to the first internal electrodes 11. The second major surface 10b is overlaid with the second external electrode 14. The second external electrode 14 is connected to the second internal electrodes 12.

Each of the first and second internal electrodes 11 and 12 and the first and second external electrodes 13 and 14 can preferably be made of the same material as in the first preferred embodiment.

As illustrated in FIGS. 12 and 13, the ceramic sintered body 10 includes the first and second outer layer portions 10A and 10B, the first and second side gaps 10C and 10D, and the inner layer portion 10E.

The first and second outer layer portions 10A and 10B are portions outside the portions in which the first and second internal electrodes are disposed in the opposing direction of the first and second internal electrodes (=width direction W). Specifically, in the present preferred embodiment, the first and second outer layer portions 10A and 10B are disposed in both ends in the width direction W of the ceramic sintered body 10.

The first and second side gaps 10C and 10D are portions in which none of the first and second internal electrodes 11 and 12 is disposed when seen from the opposing direction (=width direction W). Specifically, in the present preferred embodiment, the first and second side gaps 10C and 10D are disposed in both ends in the longitudinal direction L of the ceramic sintered body 10.

The inner layer portion 10E is a portion in the ceramic sintered body 10 other than the first and second outer layer portions 10A and 10B and the first and second side gaps 10C and 10D. Specifically, in the present preferred embodiment, the inner layer portion 10E is disposed in a portion other than both ends in the longitudinal direction L and both ends in the width direction W of the ceramic sintered body 10. The inner layer portion 10E includes the portion in which the first and second internal electrodes 11 and 12 face each other in the width direction W and the portion in which, when seen from the width direction W, only the first or second internal electrodes 11 or 12 are disposed.

In the present preferred embodiment, for example, even when the multilayer ceramic electronic component 1 is observed with a 500× optical microscope, no bends including a plurality of inflection points (see FIG. 23) exist in ends of each of the first and second internal electrodes 11 and 12 adjacent to the first and second end surfaces 10e and 10f (fifth and sixth surfaces). Therefore, even when the ceramic layer 15 between the first and second internal electrodes 11 and 12 is thin and the number of stacked layers is large, a decrease in electrical strength is minimized or prevented. Specifically, avoiding a bend having a plurality of inflection points (that is, making the length of a bend substantially zero (about 1 µm or less)) enables a high dielectric breakdown voltage (BDV) and a long mean time to failure (MTTF). Accordingly, miniaturization, high performance, high electrical strength, and high reliability are achieved. The reason why BDV decreases and MTTF becomes short when a bend exists is that the ceramic layer between the bend and the neighboring internal electrode includes a local thin portion and an electric field concentrates on that thin portion.

Next, an example of a method of producing the multilayer ceramic electronic component 1 according to the present preferred embodiment is described in detail with reference to the FIGS. 14 to 18.

Figure 14:
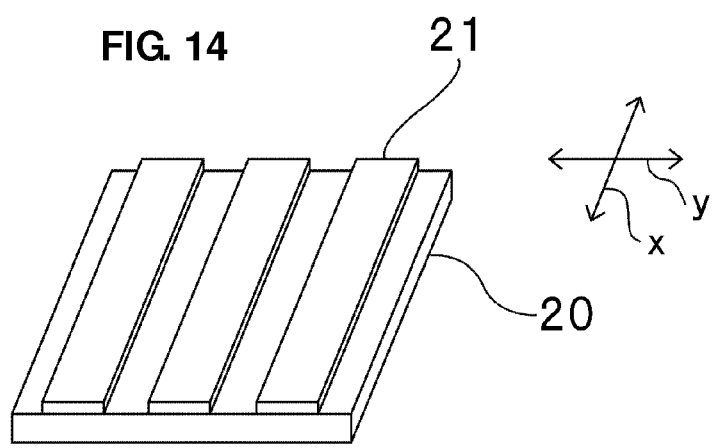
FIG. 14 is a schematic perspective view of a ceramic green sheet on which conductive patterns are printed.

First, the ceramic green sheet 20 illustrated in FIG. 14 is shaped. A method of shaping the ceramic green sheet 20 is not particularly limited. The ceramic green sheet 20 can preferably be shaped using a die coater, a gravure coater, a microgravure coater, or other coaters, for example.

Then, the conductive patterns 21 extending in parallel or substantially in parallel to each other along the first direction x are formed on the ceramic green sheet 20. The conductive patterns 21 are for forming the first and second internal electrodes 11 and 12. A method of forming the conductive patterns 21 is not particularly limited. The conductive patterns 21 can preferably be formed by screen printing, ink-jetting, gravure printing, or other methods, for example.

Figure 15:
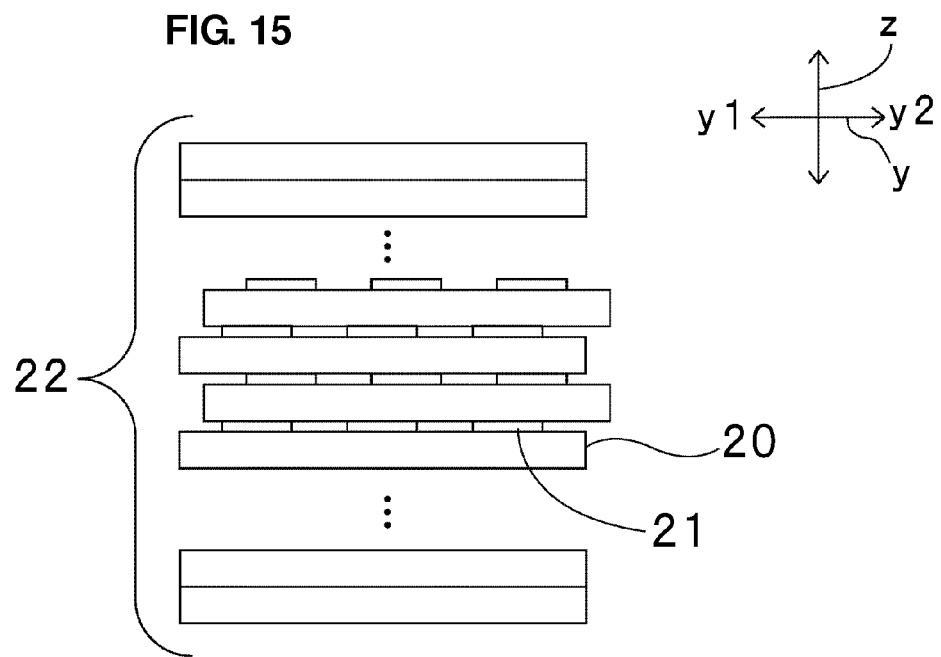
FIG. 15 is a schematic front view for describing a process of forming a stack.

Then, a stack 22 is formed, as illustrated in FIG. 15. Specifically, first, after ceramic green sheets 20 not including the conductive patterns 21 are stacked, ceramic green sheets 20 including the conductive patterns 21 are stacked such that they are alternately displaced on one side y1 and the other side y2 in the second direction y orthogonal to the first direction x. Additionally, ceramic green sheets 20 not including the conductive patterns 21 are stacked on the above-described stack, and the stack 22 is completed.

Then, the obtained stack 22 is pressed in the stacking direction z by hydrostatic pressing or other suitable methods, for example.

Figure 16:
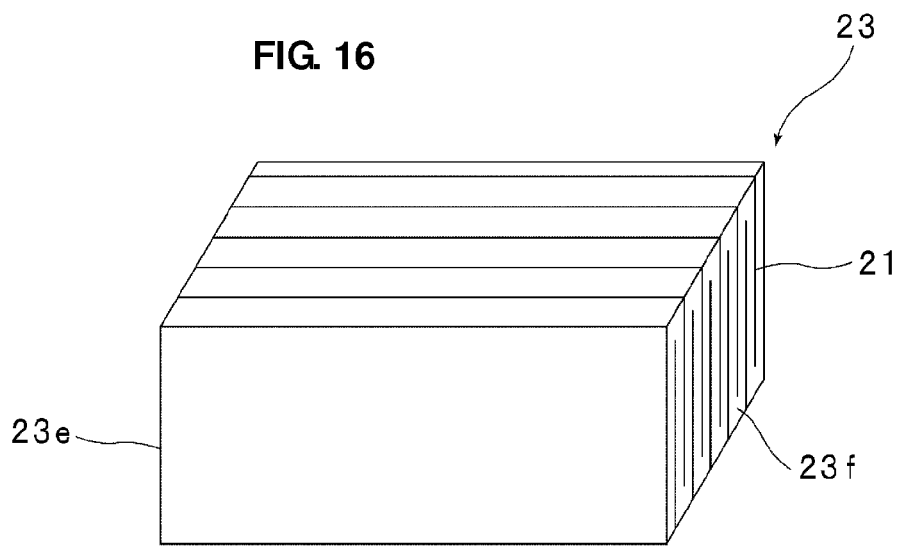
FIG. 16 is a schematic perspective view of a ceramic member.

Then, the pressed stack 22 is cut along the first direction x and the second direction y, and the ceramic members 23 each having a substantially rectangular parallelepiped shape illustrated in FIG. 16 are formed. The stack 22 can be cut by dicing or by pressing down. The stack 22 can also be cut using a laser. In particular, the stack 22 may preferably be cut by dicing or using a laser, for example. This is because less stress is exerted on the stack 22 at the time of cutting and a bend is not likely to occur.

Figure 17:
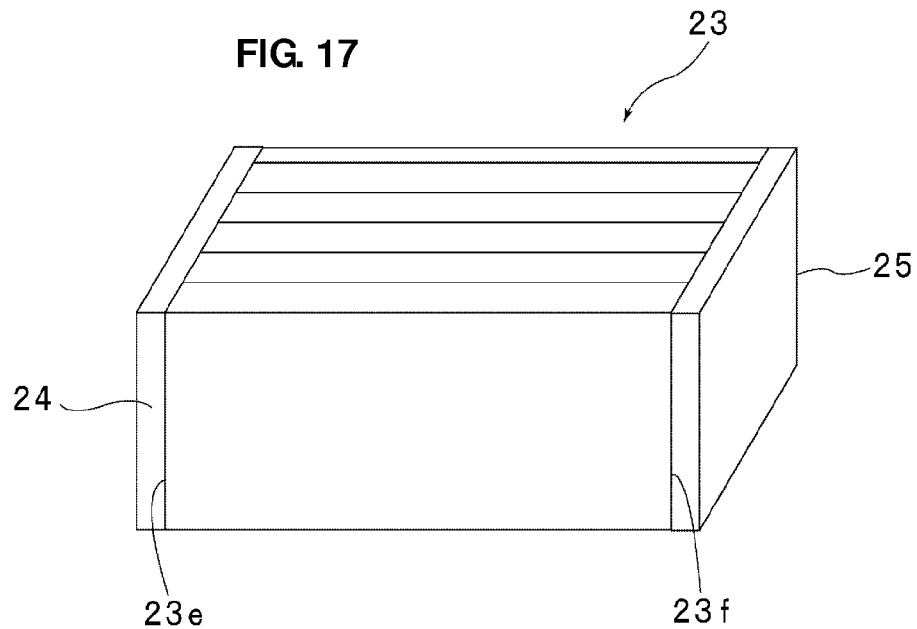
FIG. 17 is a schematic perspective view that illustrates a process of forming a ceramic layer on both end surfaces.

Then, as illustrated in FIG. 17, the ceramic layers 24 and 25 are formed on the end surfaces 23e and 23f of each of the ceramic members 23 so as to cover the end surfaces 23e and 23f. The ceramic layers 24 and 25 are for forming the first and second side gaps 10C and 10D.

A method of forming the ceramic layers 24 and 25 is not particularly limited. They can preferably be formed by printing, such as screen printing, ink-jetting, coating, such as gravure coating, spraying, or other suitable methods, for example.

Figure 18:
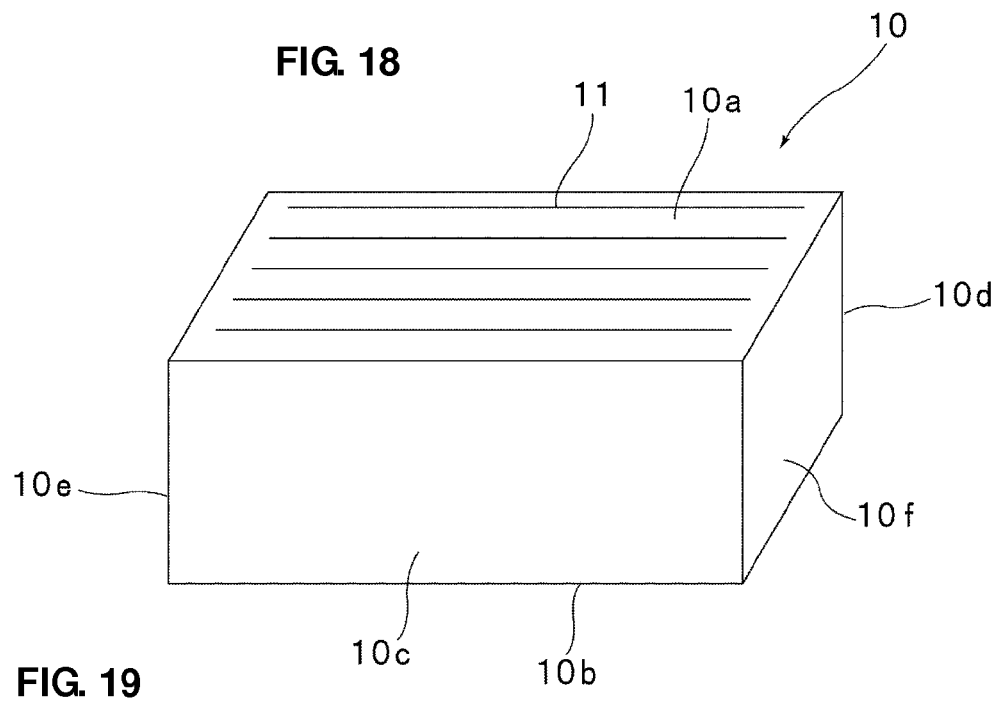
FIG. 18 is a schematic perspective view of the ceramic sintered body.

Then, the ceramic member 23 including the ceramic layers 24 and 25 is sintered. In this manner, the ceramic sintered body 10 illustrated in FIG. 18 is completed.

Lastly, the first and second external electrodes 13 and 14 are formed, and the multilayer ceramic electronic component 1 illustrated in FIGS. 11 to 13 is completed. A method of forming the first and second external electrodes 13 and 14 is not particularly limited. The first and second external electrodes 13 and 14 may be formed by baking after conductive paste is applied, for example. In that case, the conductive paste may be applied before the ceramic member 23 is fired, and the first and second external electrodes 13 and 14 may be formed simultaneously during firing. The first and second external electrodes 13 and 14 may also be formed by plating, for example.

Figure 19:
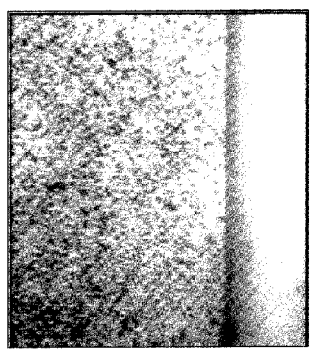
FIG. 19 is a photograph of a cross section of the multilayer ceramic electronic component produced by a method according to a preferred embodiment of the present invention.

With the above-described production method, the conductive patterns 21 are striped, the conductive patterns 21 are cut by cutting the stack 22, thus forming both ends in the thickness direction T of the first and second internal electrodes 11 and 12. Accordingly, as illustrated in FIG. 19, bends including a plurality of inflection points do not occur in both ends in the thickness direction T of each of the first and second internal electrodes 11 and 12. FIG. 19 is a photograph of a cross section of the multilayer ceramic electronic component 1 produced by the above-described producing method. The photograph of FIG. 19 shows a plurality of internal electrodes extending in a horizontal direction in FIG. 19.

The end of the first internal electrode 11 in the thickness direction T adjacent to the second external electrode 14 (see FIG. 12) and the end of the second internal electrode 12 in the thickness direction T adjacent to the first external electrode 13 are not formed by cutting. However, for example, even if misregistration in the stacking of the ceramic green sheets 20 in the y direction illustrated in FIG. 15 occurs in a process of stacking the ceramic green sheets 20, unless that misregistration is large, the ceramic green sheets 20 and the conductive patterns 21 having substantially the same thickness are vertically positioned. Accordingly, a bend including a plurality of inflection points does not occur in the end of the first internal electrode 11 in the thickness direction T adjacent to the second external electrode 14 (see FIG. 12) and the end of the second internal electrode 12 in the thickness direction T adjacent to the first external electrode 13.

A method by which a bend is prevented from occurring is not particularly limited. For example, stacking the ceramic green sheets 20 with significantly high positional accuracy can also prevent the occurrence of a bend.

When the conductive patterns 21 are printed on the ceramic green sheet 20 by the above-described production method, for example, as described in Japanese Unexamined Patent Application Publication No. 2006-335045, a portion that is thicker than the other portions, a so-called saddle, may be formed in an end of any of the conductive patterns 21. Therefore, for example, if the saddles in the conductive patterns overlap each other in the stacking direction, a large stress is exerted on the region in which the saddles overlap each other during pressing. Thus, during pressing, the conductive patterns 21 may be deformed, and the first and second internal electrodes 11 and 12 may not have desired shapes. In addition, a crack may occur during firing.

However, the ends in the longitudinal direction L of the first and second internal electrodes 11 and 12 that overlap one another in the width direction W (stacking direction) are formed by cutting of the conductive pattern 21. Therefore, no saddles are formed in the ends in the longitudinal direction L of the first and second internal electrodes 11 and 12. Accordingly, the occurrence of a crack during firing is effectively prevented. Thus, the first and second internal electrodes 11 and 12 having desired shapes and dimensions are easily obtained.

In contrast, saddles may be formed in the ends in the thickness direction T of the first and second internal electrodes 11 and 12. However, the ends in the thickness direction T of the first internal electrode 11 and the ends in the thickness direction T of the second internal electrode 12 do not overlap each other in the width direction W (stacking direction). Accordingly, even if saddles are formed in the ends in the thickness direction T of the first and second internal electrodes 11 and 12, a crack is less likely to occur during firing. Thus, the first and second internal electrodes 11 and 12 having desired shapes and dimensions are easily obtained.

Figure 20:
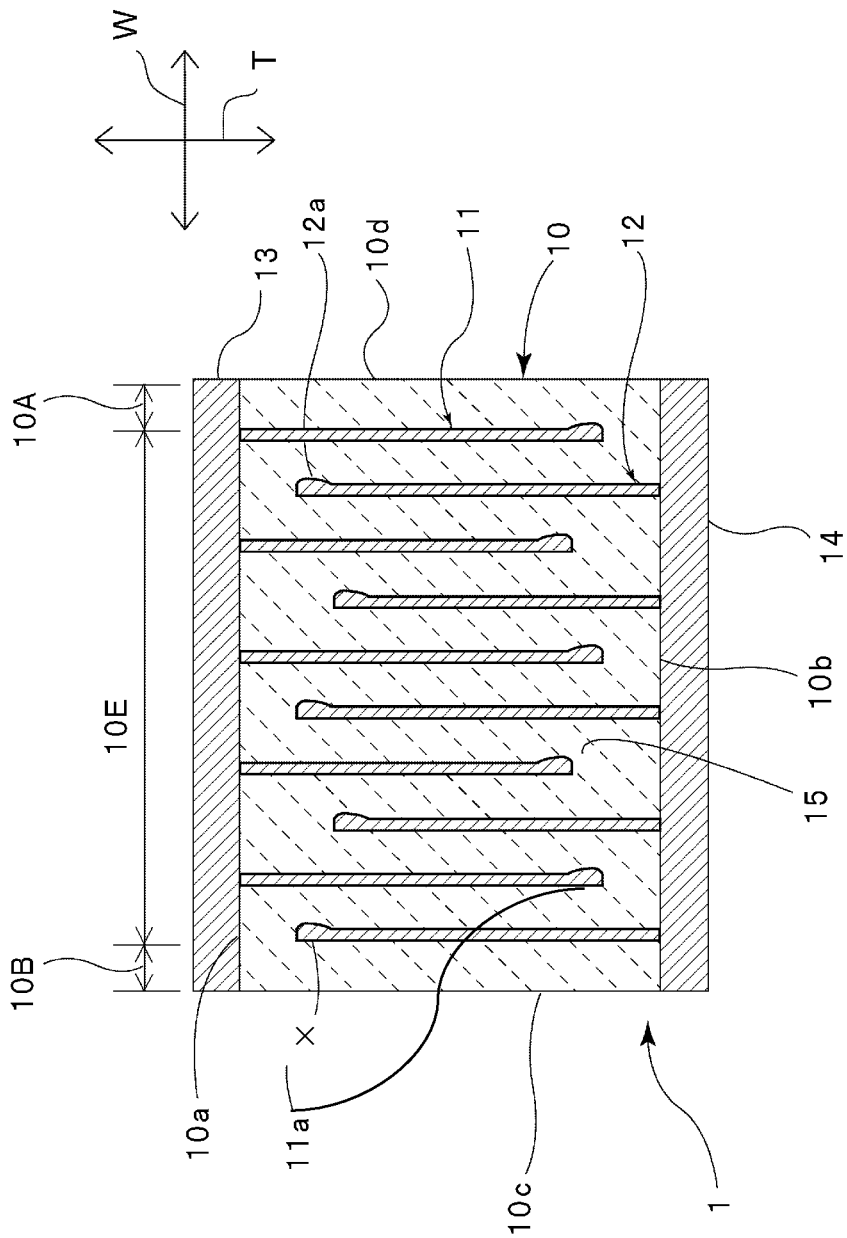
FIG. 20 is a schematic cross-sectional view of a ceramic electronic component according to a first modified example of a preferred embodiment of the present invention.

As illustrated in, for example, FIG. 20, at least the positions of the saddles 11a and 12a formed in the ends in the direction T perpendicular or substantially perpendicular to the stacking direction of the first or second internal electrodes 11 or 12 adjacent to each other in the stacking direction (width direction W) may preferably be different from each other in the direction T. In such a case, even if the saddles 11a and 12a occur, because the positions of the saddles 11a and 12a do not overlap each other in the stacking direction, a large stress does not tend to concentrate on the region in which the saddles 11a and 12a are disposed. Accordingly, the occurrence of a crack is prevented, and the first and second internal electrodes 11 and 12 having desired shapes and dimensions are easily obtained.

The end in the direction T of each of the saddles 11a and 12a has a shape in which the width in the width direction W is reduced toward the outside. Thus, the advantageous effect in which the ceramic layers 15 are more resistant to separation than, for example, the case in which the end in the direction T of each of the saddles 11a and 12a has a rectangular cross section along the direction T is also obtained.

It is not essential that the saddles 11a and 12a do not overlap each other completely when seen from the direction T. For example, it is only required that the positions of the thickest portions of the saddles 11a and 12a be different from each other when seen from the direction T.

The present preferred embodiment describes an example in which the first and second internal electrodes 11 and 12 are parallel or substantially parallel to the first and second side surfaces 10c and 10d, the first internal electrodes 11 are extended to the first major surface 10a, and the second internal electrodes 12 are extended to the second major surface 10b. The arrangement of the first and second internal electrodes according to preferred embodiments of the present invention is not limited to the above-described arrangement.

For example, the first and second internal electrodes may preferably be parallel or substantially parallel to the first and second major surfaces or the first and second end surfaces.

Figure 21:
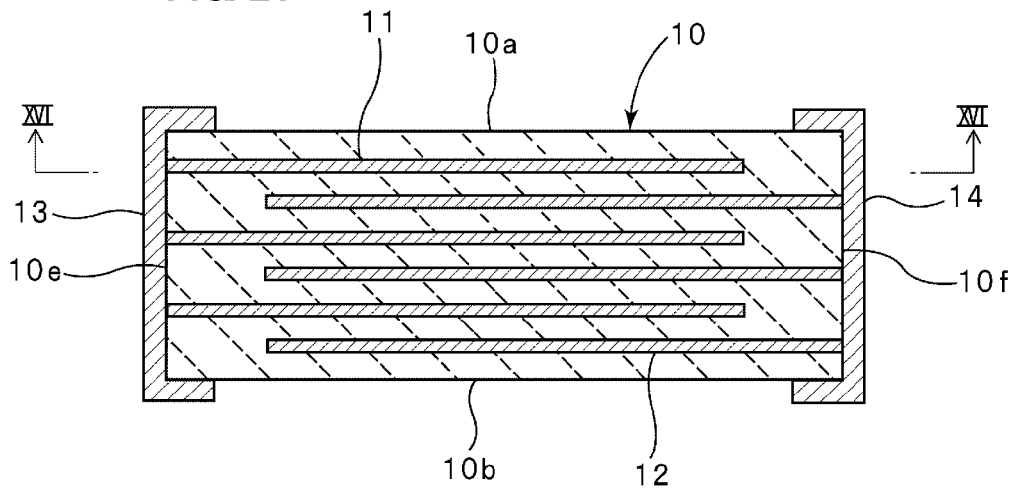
FIG. 21 is a schematic cross-sectional view of a ceramic electronic component according to a second modified example of a preferred embodiment of the present invention.
Figure 22:
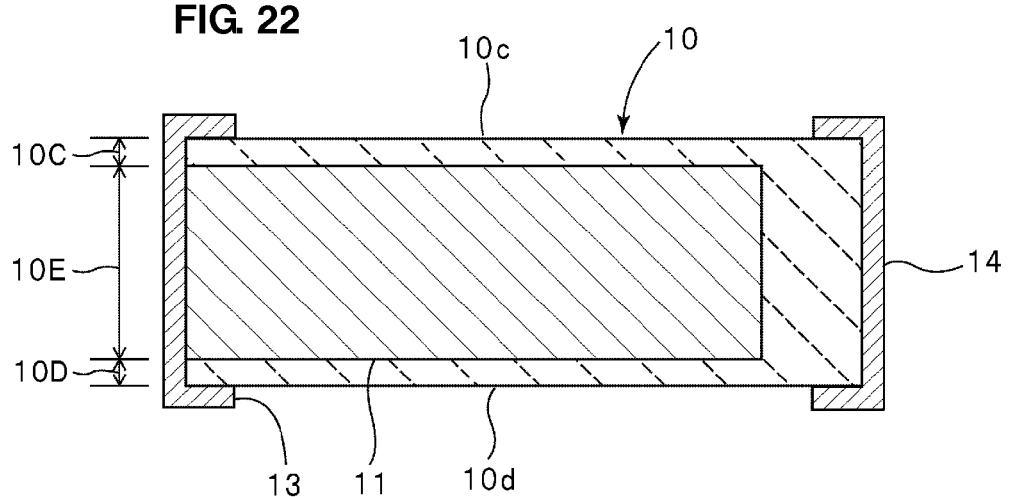
FIG. 22 is a schematic cross-sectional view taken along the line XVI-XVI in FIG. 21.

FIG. 21 is a schematic cross-sectional view of a ceramic electronic component according to a second modified example of a preferred embodiment of the present invention. FIG. 22 is a schematic cross-sectional view of the ceramic electronic component according to the second modified example taken along the line XVI-XVI in FIG. 21. As illustrated in FIG. 21, in the present modified example, the first and second internal electrodes 11 and 12 are parallel or substantially parallel to the first and second major surfaces 10a and 10b. The first internal electrodes 11 are extended to the first end surface 10e and are connected to the first external electrode 13 on the first end surface 10e. The second internal electrodes 12 are extended to the second end surface 10f and are connected to the second external electrode 14 on the second end surface 10f. In the present modified example, the side gaps 10C and 10D are positioned in the ends adjacent to the first and second side surfaces 10c and 10d in the ceramic sintered body 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a ceramic sintered body having a substantially rectangular parallelepiped shape and including first and second surfaces extending along a first direction and a second direction perpendicular or substantially perpendicular to the first direction, third and fourth surfaces extending along the first direction and a third direction perpendicular or substantially perpendicular to both the first and second directions, and fifth and sixth surfaces extending along the second and third directions; and
   a plurality of first and second internal electrodes alternately arranged in the ceramic sintered body so as to face each other; wherein
   the plurality of first and second internal electrodes are parallel or substantially parallel to the first and second surfaces, are exposed to the third and fourth surfaces, and are not exposed to the fifth and sixth surfaces; and
   no bends exist in any ends of each of the first and second internal electrodes, the ends being adjacent to the fifth and sixth surfaces.

2. The multilayer ceramic electronic component according to claim 1, wherein
   the ceramic sintered body includes first and second major surfaces extending along a longitudinal direction and a width direction, first and second end surfaces extending along the width direction and a thickness direction, and first and second side surfaces extending along the longitudinal direction and the thickness direction; and
   the first direction is the longitudinal direction, the second direction is the width direction, the third direction is the thickness direction, the first and second surfaces are the first and second major surfaces, the third and fourth surfaces are the first and second side surfaces, and the fifth and sixth surfaces are the first and second end surfaces.

3. The multilayer ceramic electronic component according to claim 1, wherein the first direction is a longitudinal direction, the second direction is a thickness direction, the third direction is a width direction, the first and second surfaces are first and second side surfaces, the third and fourth surfaces are first and second major surfaces, and the fifth and sixth surfaces are first and second end surfaces.

4. The multilayer ceramic electronic component according to claim 1, wherein
   the plurality of first internal electrodes is exposed to the third surface, ends thereof adjacent to the fourth surface are not exposed to the fourth surface, the plurality of second internal electrodes is exposed to the fourth surface, and ends thereof are not exposed to the third surface;
   each of at least the plurality of first internal electrodes or the plurality of second internal electrodes includes a saddle in an end adjacent to the fourth surface or the third surface, the saddle being thicker than a remaining portion of the internal electrode; and
   of at least the plurality of saddles in the plurality of first internal electrodes or the plurality of saddles in the plurality of second internal electrodes, at least one saddle of the plurality of saddles does not overlap remaining saddles of the plurality of saddles in the third direction.

5. The multilayer ceramic electronic component according to claim 1, wherein a ceramic layer disposed between at least one of the plurality of first and second internal electrodes facing each other has a thickness within a range of about 0.3 µm to about 2 µm.

6. The multilayer ceramic electronic component according to claim 1, wherein a ceramic layer disposed between at least one of the plurality of the first and second internal electrodes facing each other has a thickness within a range of about one to about three times a thickness of each of the plurality of first and second internal electrodes.

* * * * *